United States Patent [19]

Kitagawa

[11] Patent Number: 5,692,818
[45] Date of Patent: Dec. 2, 1997

[54] FILM VIEWER

[75] Inventor: Kuniharu Kitagawa, Kanagawa, Japan

[73] Assignee: Fuji Photo Film Co., Ltd., Kanagawa, Japan

[21] Appl. No.: 556,087

[22] Filed: Nov. 9, 1995

[30] Foreign Application Priority Data

Nov. 11, 1994 [JP] Japan .................. 6-278058

[51] Int. Cl.⁶ ............................ G03B 21/14
[52] U.S. Cl. .............. 353/26 R; 353/95; 353/DIG. 2; 40/364; 40/362
[58] Field of Search ................ 353/18, 43, 95, 353/DIG. 2, 26 R, 25; 40/362, 363, 364, 367

[56] References Cited

U.S. PATENT DOCUMENTS

| | | | |
|---|---|---|---|
| 2,588,803 | 3/1952 | Coffey, Sr. | 40/364 |
| 3,104,483 | 9/1963 | Thompson et al. | 40/364 |
| 3,522,672 | 8/1970 | Hinds | 40/364 |
| 4,073,581 | 2/1978 | Rayburn | 40/364 |
| 4,234,244 | 11/1980 | Klein | 40/363 |
| 4,491,434 | 1/1985 | Barr et al. | 40/364 |
| 5,424,790 | 6/1995 | Tsunefuji et al. | 353/DIG. 2 |
| 5,521,662 | 5/1996 | Suzuki | 353/DIG. 2 |

FOREIGN PATENT DOCUMENTS 3175448  7/1991  Japan .

Primary Examiner—William Dowling
Attorney, Agent, or Firm—Sughrue, Mion, Zinn, Macpeak & Seas, PLLC

[57] ABSTRACT

A film viewer into which is loaded a cartridge which has a spool for taking up a film, a door provided at a film entrance/exit, and an engagement shaft for opening and closing the door, the film viewer being used to view a film which is wound on the spool and removed from the cartridge, the film viewer including: a cartridge accommodating portion which accommodates the cartridge; a rotating shaft provided in the cartridge accommodating portion and engaging the spool when the cartridge is accommodated into the cartridge accommodating portion; a film accommodating portion which accommodates the film removed from the cartridge; and a window portion provided between the cartridge accommodating portion and the film accommodating portion, the film being viewable through the window portion.

19 Claims, 9 Drawing Sheets

FIG. 5
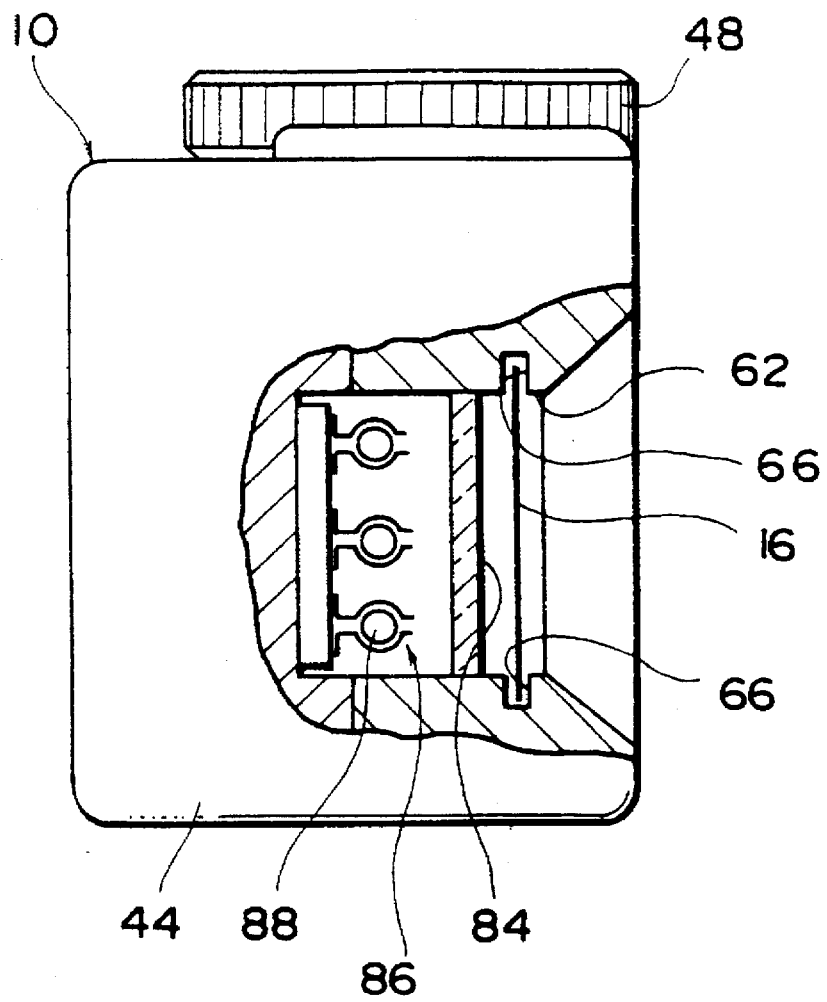
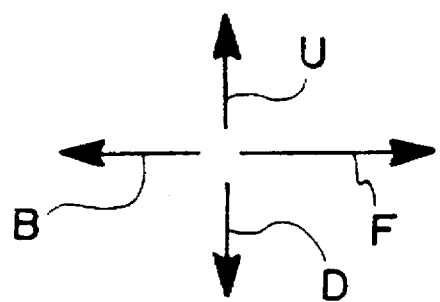

F I G. 6
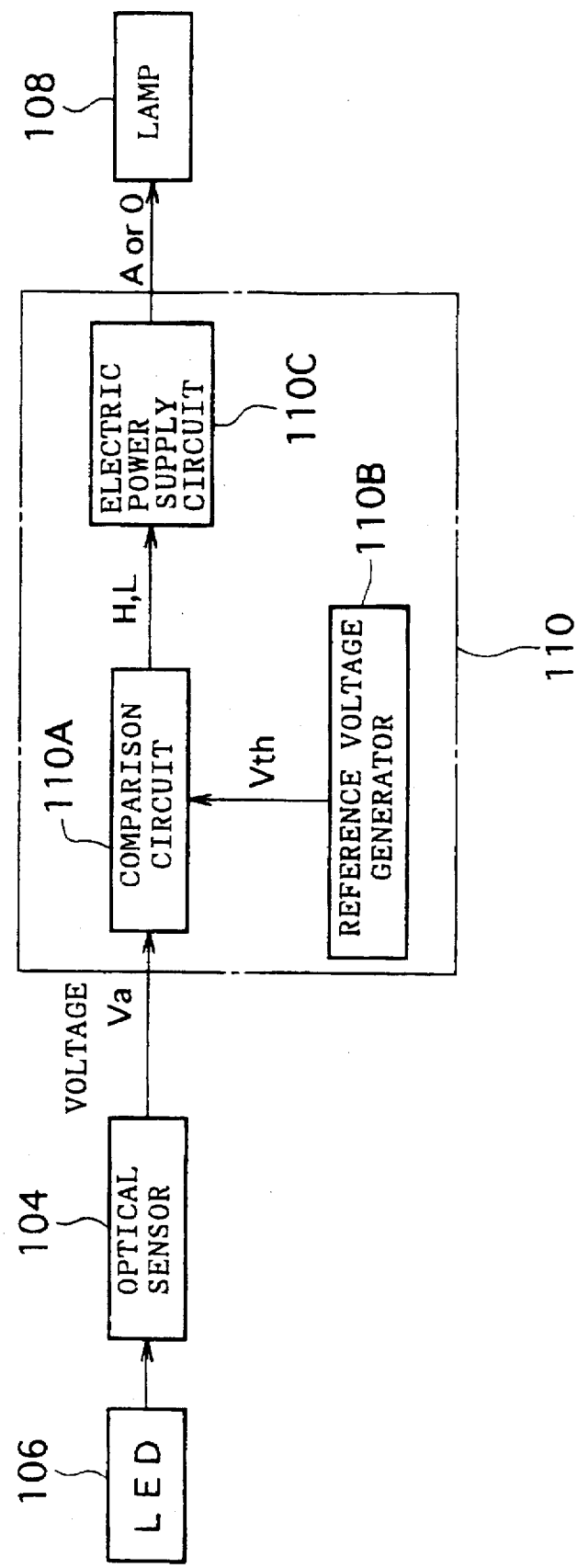

FILM VIEWER

BACKGROUND OF THE INVENTION

1. Field of the Invention

The present invention relates to a film viewer for withdrawing a film accommodated in a cartridge from the cartridge in order to view the film.

2. Description of the Related Art

Conventionally, in a case in which a user requests prints of a photographed 35 mm film at a photography shop, when the user returns to pick up the prints, the prints are given and the film is returned to the user. Usually, the returned negative film is cut into strips of six frames which are placed in accommodating portions of a transparent negative film case.

When a film is to be reprinted or the like at a laboratory, because the setting of a film at a printer or the like must be carried out one time for each film, it is more efficient to use a film which has been accommodated in a cartridge rather than film strips of six frames. In a film with magnetic layers which has been proposed in recent years, it is difficult to read the magnetic information of negatives which have been cut and separated. Therefore, a method in which a developed film is placed in the cartridge and returned to the user has been proposed (Japanese Patent Application Laid-Open No. 3-175448).

However, a film which has not been cut is long and difficult to hold, and it is difficult for an average user to withdraw the film from the cartridge and easily view the images. Further, when the film is withdrawn from the cartridge, dirt from handling or the like may adhere to the image surfaces, or the image quality may be deteriorated, e.g., the film may be damaged, when it is withdrawn.

SUMMARY OF THE INVENTION

In view of the aforementioned, an object of the present invention is to provide a film viewer which enables a film accommodated in a cartridge to be easily viewed, and which has a simple structure and is inexpensive.

A first aspect of the present invention is a film viewer into which is loaded a cartridge which has a spool for taking up a film, a door provided at a film entrance/exit, and an engagement shaft for opening and closing the door, the film viewer being used to view a film which is wound on the spool and removed from the cartridge, the film viewer comprising: a cartridge accommodating portion which accommodates the cartridge; a rotating shaft provided in the cartridge accommodating portion and engaging the spool when the cartridge is accommodated into the cartridge accommodating portion; a film accommodating portion which accommodates the film removed from the cartridge; and a window portion provided between the cartridge accommodating portion and the film accommodating portion, the film being viewable through the window portion.

A second aspect of the present invention is a film viewer in which, in the first aspect, the film accommodating portion has curved springs which contact portions of the film.

A third aspect of the present invention is a film viewer in which, in the first aspect, the film accommodating portion has ribs having curved surfaces which contact portions of the film.

A fourth aspect of the present invention is a film viewer in which the first aspect further comprises a door opening member engaging the engagement shaft of the cartridge to open the door of the cartridge at the time the cartridge is accommodated into the cartridge accommodating portion.

A fifth aspect of the present invention is a film viewer in which the first aspect further comprises a door closing member operating the engagement shaft of the cartridge to close the door at the time the cartridge accommodated in the cartridge accommodating portion is removed therefrom.

A sixth aspect of the present invention is a film viewer in which the first aspect further comprises a light source illuminating the film corresponding to the window portion.

A seventh aspect of the present invention is a film viewer in which the sixth aspect further comprises a switch which turns on the light source when the cartridge is accommodated into the cartridge accommodating portion.

An eighth aspect of the present invention is a film viewer in which the first aspect further comprises a detecting member detecting a trailing end portion of the film, and an indicating member indicating that the trailing end portion has been reached when the trailing end portion is detected by the detecting member.

In accordance with the first aspect of the present invention, because the rotating shaft engages the spool when the cartridge is accommodated in the cartridge accommodating portion, the film can be delivered out to the exterior of the cartridge from the film entrance/exit by the rotating shaft being rotated in a predetermined direction. The film delivered out in this way can be observed through the window portion. Note that the cartridge door is opened before the rotating shaft is rotated.

After the film removed from the cartridge passes by the window portion, the film is accommodated in the film accommodating portion. The film delivered into the film accommodating portion curls into a cylindrical shape due to the curl thereof which is caused by the film having been wound on the spool. As a result, there is no need to provide a take-up shaft in the film accommodating portion, as is provided in a camera for example. Further, there is also no need for a mechanism to rotate a take-up shaft. Therefore, the number of parts is kept to a minimum, and the structure does not become complex.

In accordance with the second aspect of the present invention, portions of the film delivered into the film accommodating portion contact the curved springs and are curled therealong. Due to the radii of curvature of the curved springs, the diameter of the film which first curls into a cylindrical shape can be kept small. Because the urging force of the springs is applied in a direction toward the inner side of the film, the film is wound in an orderly manner without gaps. As the film is wound, the diameter thereof increases, and the increase in the film diameter is permitted because the springs extend such that the curvatures thereof increase. It is preferable that the portions which contact the springs are the transverse direction side portions of the film not contacting the image frames.

In accordance with the third aspect of the present invention, portions of the film delivered into the film accommodating portion contact the curved surfaces of the ribs and curl therealong. It is preferable that the portions which contact the curved surfaces are the transverse direction side portions of the film not contacting the image frames.

In accordance with the fourth aspect, when the cartridge is accommodated into the cartridge accommodating portion, the door opening member engages the engagement shaft of the cartridge for opening and closing the cartridge door, and opens the cartridge door automatically.

In accordance with the fifth aspect, when the cartridge accommodated in the cartridge accommodating portion is removed, the door closing member automatically closes the door.

In accordance with the sixth aspect, the film corresponding to the window portion can be illuminated by the light source.

In accordance with the seventh aspect, when the cartridge is accommodated into the cartridge accommodating portion, the switch is turned on, and the light source is automatically lit. Further, when the cartridge is removed from the cartridge accommodating portion, the switch is turned off, and the light source is automatically turned off.

In accordance with the eighth aspect of the present invention, when the film end (the trailing end portion) of the film removed from the cartridge is detected by the detecting member, the indicating member indicates that the film end has been reached. The film end can be detected by a perforation or the like, which indicates the film end, being detected by a sensor.

BRIEF DESCRIPTION OF THE DRAWINGS

FIG. 5 is a partial cross-sectional view of the film viewer viewed from a left side.

FIG. 6 is a block view of a film end detecting device.

DESCRIPTION OF THE PREFERRED EMBODIMENTS

An embodiment of a film viewer of the present invention will be described in accordance with FIGS. 1 through 6.

First, a cartridge 12 used with a film viewer 10 of the present embodiment will be described.

Figure 1:
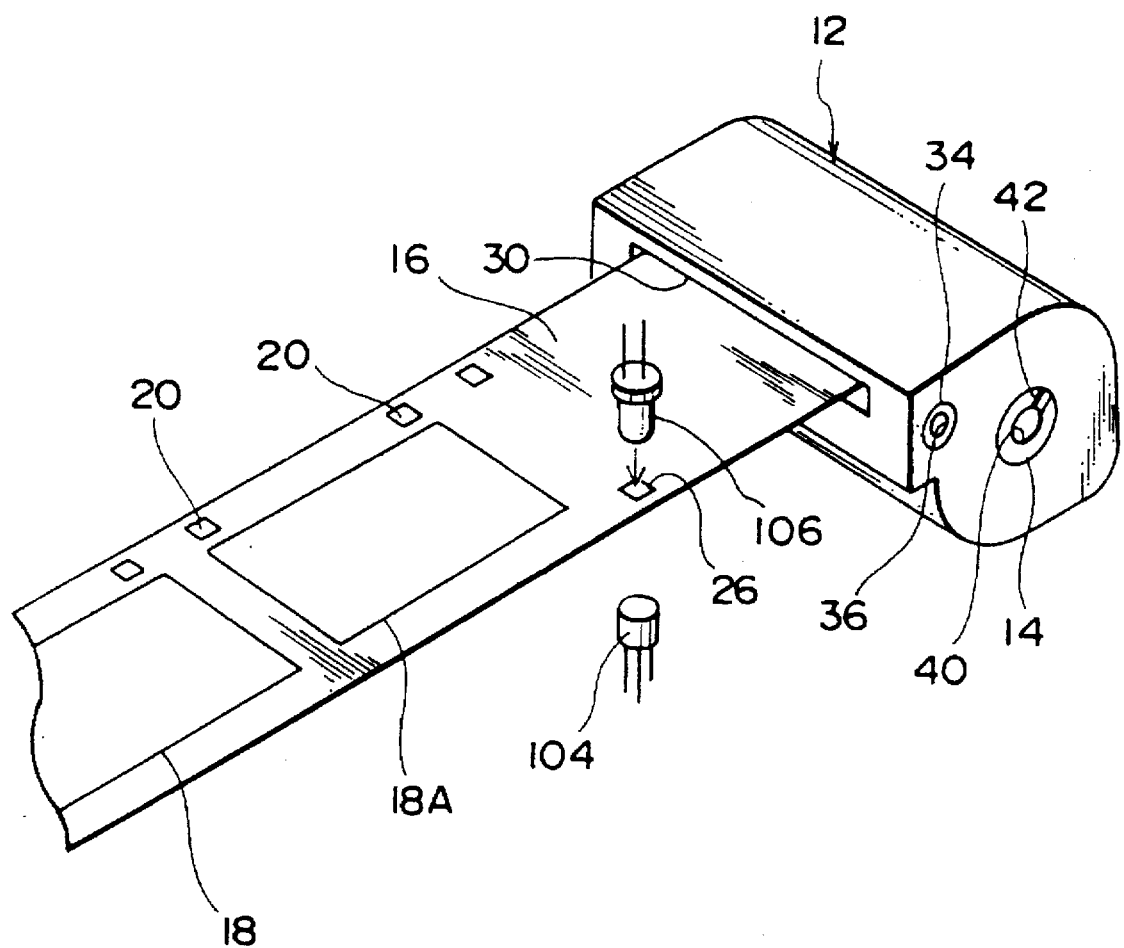
FIG. 1 is a perspective view of a cartridge used in a film viewer of an embodiment of the present invention.

As illustrated in FIG. 1, a spool 14 is provided in the cartridge 12. One end of a film 18 engages the spool 14, and the film 16 is taken up on the spool 14 in a roll-form and is accommodated within the cartridge 12.

Perforations 20 are formed in the film 16 in one of the transverse direction end portions thereof so as to correspond to the positions of image frames 18. Unillustrated magnetic tracks on which magnetic information is recorded are provided between the perforations 20 at positions adjacent to the image frames 18. The magnetic tracks are formed on the surface of the film 16 which is positioned at the radial direction outer side when the film 16 has been taken up onto the spool 14. Various types of information, such as information at the time of photographing the images recorded on the image frames 18, print sizes and exposure conditions at the time of print processing, and the like are recorded on these magnetic tracks. Primarily information at the time of photographing by a photographing device such as a camera or the like is recorded on unillustrated magnetic strips provided at the other transverse direction end portion.

A perforation indicating a final image frame 18A, i.e., a turn-around perforation 26, is formed further toward the trailing end of the film 16 than the final image frame 18A in the transverse direction end portion of the film 16 opposite that in which the perforations 20 are formed.

A film entrance/exit 30 for the film 16 is provided in the cartridge 12, and is opened and closed by an unillustrated door. By rotating a door shaft 34, which serves as an engagement shaft, so as to open the door, the film 16 can enter or exit the cartridge 12. A hole 36, into which an unillustrated driver for rotating the door shaft 34 is inserted, is formed at an end portion of the door shaft 34.

A hole 40 and a groove 42 are formed at an end portion of the spool 14. When the film 16 is to be taken up, an unillustrated take-up shaft of a camera or spool driver is inserted into the hole 40 and the groove 42.

As illustrated in FIGS. 2 through 5, the film viewer 10 includes a main case 44 which is substantially rectangular in plan view and which is formed from synthetic resin or the like.

Figure 2:
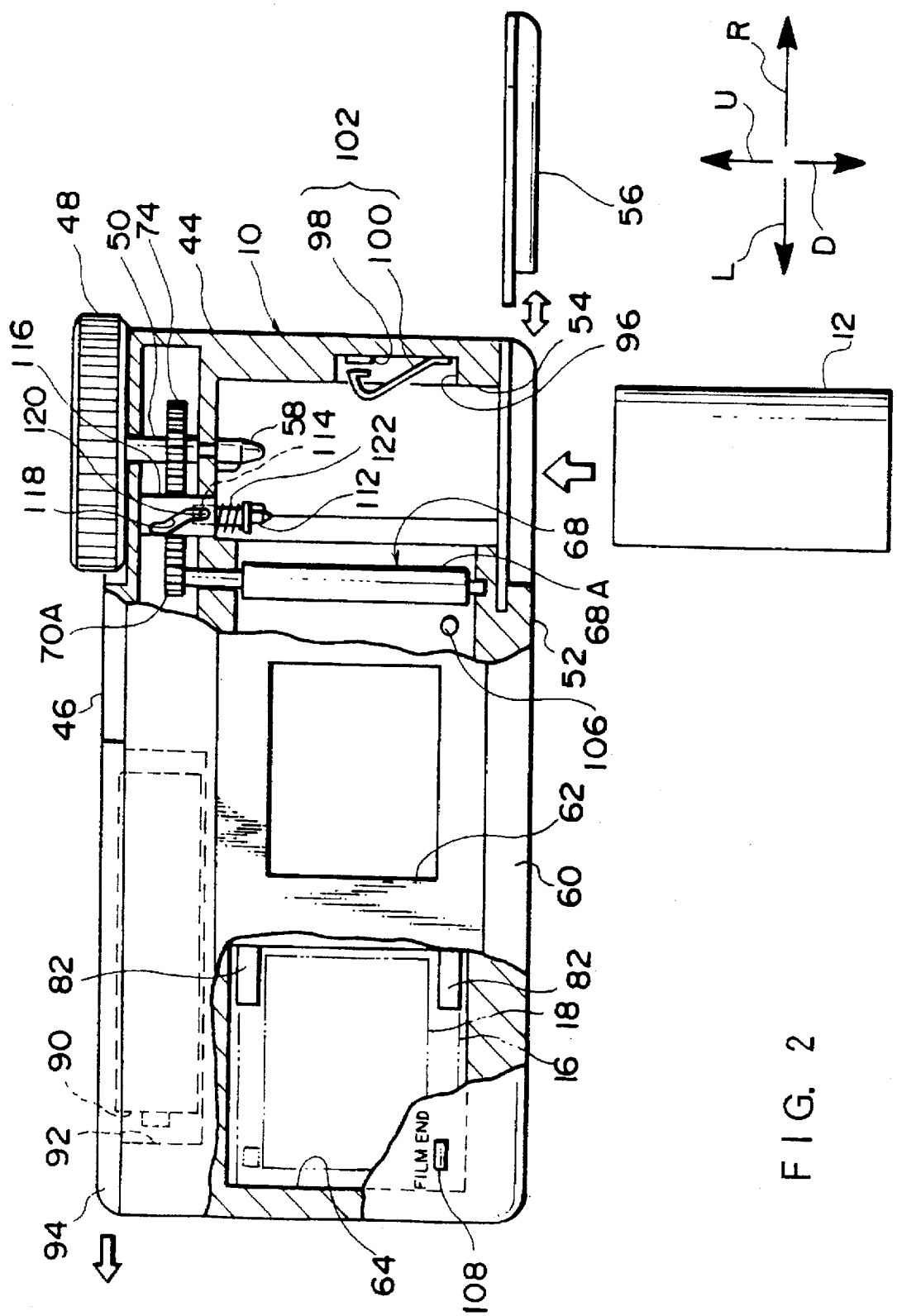
FIG. 2 is a partial cross-sectional view, viewed from the front, of the film viewer relating to the embodiment of the present invention.
Figure 3:
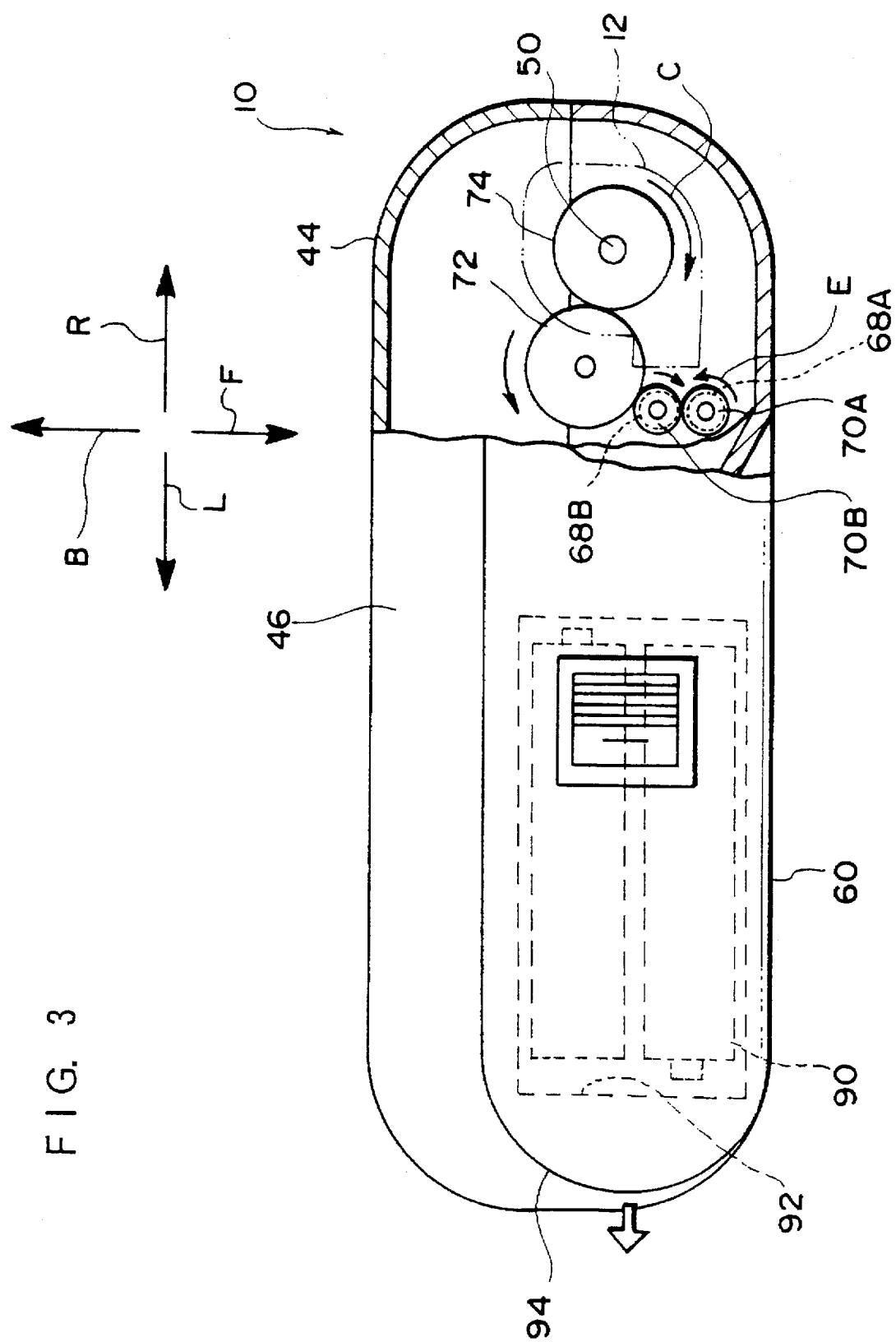
FIG. 3 is a partial cross-sectional view, viewed from above, of the film viewer illustrated in FIG. 2.

As shown in FIGS. 2 and 3, a knob 48 is provided at a top plate 46 of the main case 44 in a vicinity of the end portion at the side in the direction of arrow R. The knob 48 is fixed to one end of a rotating shaft 50 which is supported at the top plate 46 so as to be freely rotatably.

A cartridge accommodating portion 54 is formed in the main case 44 at the lower side (i.e., at the side in the direction of arrow D) of the knob 48. The cartridge accommodating portion 54 opens toward a bottom plate 52 side and can be closed by a sliding bottom cover 56.

A spool driver 58, which projects from the deep portion of the cartridge accommodating portion 54 (i.e., from the arrow U direction portion of the cartridge accommodating portion 54), is formed integrally with the other end of the rotating shaft 50.

A rectangular window portion 62 is formed in the center of a front surface plate 60 of the main case 44. The window portion 62 is formed so as to be slightly larger than the image frame 18 of the film 16.

Figure 4:
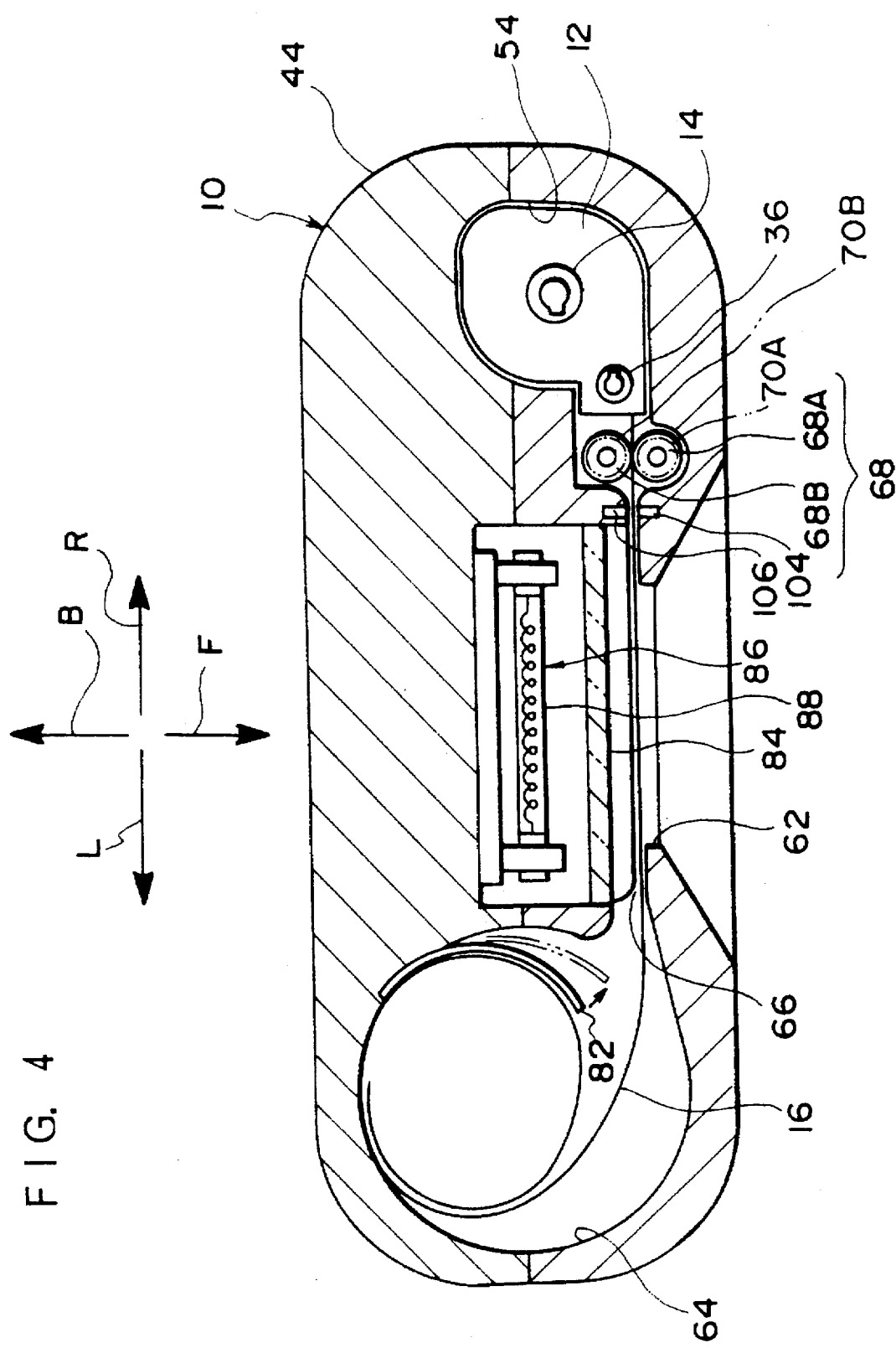
FIG. 4 is a cross-sectional view of the film viewer viewed from above.

As illustrated in FIGS. 2 and 4, a film accommodating portion 64 is formed in the main case 44 at the opposite side of the cartridge accommodating portion 54 (i.e., at the L direction side of a substantially central portion of the main case 44 in the longitudinal direction thereof), with the window portion 62 being between the cartridge accommodating portion 54 and the film accommodating portion 64. As shown in FIGS. 4 and 5, a pair of guide grooves 66 are formed at the inner side (i.e., at the B direction side) of the window portion 62. The end portions of the film 16 which is conveyed from the cartridge accommodating portion 54 to the film accommodating portion 64 are inserted into and guided by the guide grooves 66. The guide grooves 66 serve to keep the film 16 in a planar form.

As shown in FIG. 4, a nip roller pair 68 which nips and conveys the film 16 is provided between the cartridge accommodating portion 54 and the guide grooves 66. The nip roller pair 68 includes a roller 68A and a roller 68B which are each supported at the main case 44 so as to be freely rotatable. The surfaces of the roller 68A and the roller 68B are covered by an elastic body such as rubber or the like.

As shown in FIG. 3, a gear 70A and a gear 70B are attached to ones of end portions of the roller 68A and the roller 68B, respectively. The gear 70A and the gear 70B mesh with each other. Accordingly, the roller 68A and the roller 68B rotate in opposite directions.

As shown in FIGS. 2 and 3, the gear 70B of the roller 68B meshes, via a gear 72 which is supported at the main case 44 so as to be freely rotatable, with a gear 74 which is attached to an intermediate portion of the rotating shaft 50.

In this way, when the knob 48 is rotated in the clockwise direction (in the direction of arrow C), the roller 68A rotates in the direction of arrow E and the roller 68B rotates in the direction opposite thereto, and the film 16 is conveyed into the guide grooves 66.

As illustrated in FIGS. 2 and 4, a pair of plate springs 82, which are respectively curved in a circular arc shape, are provided in the film accommodating portion 64.

The plate springs 82 correspond to vicinities of the side surfaces of the film 16, and are provided at positions at which the plate springs 82 do not contact the image frames 18. It is preferable that flexible members of plush, felt or the like are adhered to portions which contact the film 16, such as the guide grooves 66, the film accommodating portion 64, the plate springs 82 and the like.

As illustrated in FIGS. 4 and 5, a diffusing plate 84 and a light source 86 are disposed in the main case 44 at the inner side of the guide grooves 66 in the direction of thickness of the film viewer 10. In the present embodiment, the light source 86 is a plurality of lamps 88 which are lined in a row and in which coiled filaments are disposed within glass tubes. However, a plurality of fluorescent lamps, cold cathode tubes, miniature light bulbs, or LEDs may be lined in a row, or an EL element may be used.

The diffusing plate 84 is formed by a white or milky white resin plate through which light can pass. The diffusing plate 84 uniformly diffuses the light of the lamps 88 and illuminates the diffused light onto the film 16.

As illustrated in FIGS. 2 and 3, an accommodating portion 92 for batteries 90 is provided at the arrow L direction side upper portion (the portion in the arrow U direction) of the main case 44. By sliding open an upper cover 94 in the direction of arrow L, the batteries 90 can be replaced.

As shown in FIGS. 1 and 2, a driver 112, for engaging the hole 36 of the door shaft 34 and opening the unillustrated door of the cartridge 12, projects from the deep portion of the cartridge accommodating portion 54.

The driver 112 is formed at one end of a sliding/rotating shaft 114. The sliding/rotating shaft 114 is inserted into a pipe 116 so as to be slidable and rotatable. A cam groove 118, which is angled with respect to the axial direction, is formed in the pipe 116. A slide pin 120 which projects from the outer periphery of the sliding/rotating shaft 114, is inserted into the cam groove 118.

A coil spring 122 is attached between the driver 112 and the pipe 116 and urges the driver 112 in a direction of moving away from the deep portion of the cartridge accommodating portion 54 (i.e., urges the driver 112 in the direction of arrow D).

In the state in which no cartridge 12 is inserted in the cartridge accommodating portion 54, the slide pin 120 of the sliding/rotating shaft 114 is pushed against the arrow D direction end portion of the cam groove 118 by the urging force of the coil spring 122.

The driver 112, the sliding/rotating shaft 114, the cam groove 118, the pipe 116, the slide pin 120, and the coil spring 112 form the door opening means and the door closing means of the present invention.

As illustrated in FIG. 2, a recess 96 is provided in the side wall of the cartridge accommodating portion 54. A contact 98 and an electrically conductive plate spring 100 are attached to the deep surface of the recess 96. The contact 98 and the plate spring 100 form a main switch 102.

The plate spring 100 is bent in a mountain-like shape, and the "peak" of this mountain projects into the cartridge accommodating portion 54. When the cartridge 12 is inserted into the cartridge accommodating portion 54, the plate spring 100 is pushed such that the distal end thereof contacts the contact 98, and the switch is turned on.

The lamps 88 and the batteries 90 are connected via the main switch 102 and unillustrated electrical wires.

A film end detecting device, which is operated by the main switch 102 being turned on, is provided in the main case 44. As illustrated in FIG. 6, the film end detecting device is formed by an optical sensor 104, an LED 106, a film end indication lamp 108 serving as an indicating means, and a control circuit 110. The detecting means of the present invention is formed by the optical sensor 104, the LED 106 and the control circuit 110.

As shown in FIGS. 2 and 4, the optical sensor 104 and the LED 106 are disposed between the nip roller pair 68 and the guide grooves 66. As illustrated in FIG. 1, the optical sensor 104 and the LED 106 oppose each other in the direction of thickness of the film 16 on either side of the end portion of the film 16 in which the turn-around perforation 26 is formed.

The light emitted from the LED 106 is illuminated to the optical sensor 104. The control circuit 110 illustrated in FIG. 6 can detect the turn-around perforation 26 due to differences in the amount of light received in a case in which the light is blocked by the film 16 and in a case in which the light is not blocked. When the film 16 is between the LED 106 and the optical sensor 104, the film end indication lamp 108 is not lit. When the turn-around perforation 26 is positioned between the LED 106 and the optical sensor 104 (or when there is no film 16), the film end indication lamp 108 is lit.

FIG. 6 is a block diagram illustrating the internal structure of the control device 110. When a voltage Va from the optical sensor 104 is input to a comparison circuit 110A, the comparison circuit 110A compares the voltage Va with a reference voltage Vth generated by a reference voltage generator 110B.

An electric power supply circuit 110C is controlled by the comparison circuit 110A. When the voltage Va is less than the reference voltage Vth (i.e., when the light is blocked by the film 16), current A does not flow to the lamp 108. When the voltage Va is greater than or equal to the reference voltage Vth (i.e., when the light is not blocked by the film 16), the current A flows to the film end indication lamp 108.

Next, operation of the present embodiment will be described.

When the film 18 accommodated in the cartridge 12 is to be viewed, first, the bottom cover 56 of the film viewer 10 is opened, the cartridge 12 is inserted into the cartridge accommodating portion 54, and the bottom cover 56 is closed.

When the cartridge 12 is inserted into the cartridge accommodating portion 54, the driver 112 is inserted in and engages the hole 36 of the door shaft 34. When the cartridge 12 is inserted even further so that the driver 112 is pushed in, the coil spring 122 is compressed, and the slide pin 120 slides along the angled cam groove 118 and the driver 112 rotates a predetermined amount. The door (unillustrated) of the cartridge 12 is thereby opened, and the film 16 can be delivered out from the film entrance/exit 30. Further, when the cartridge 12 is inserted, the spool driver 58 engages with the hole 40 of the spool 14, and moreover, the main switch 102 is pushed by the cartridge 12 and is turned on. The lamps 88 and the LED 106 are lit, and the control circuit 110 is operated.

Next, when a user turns the knob 48 in the clockwise direction (the direction of arrow C), the spool 14 rotates in the clockwise direction and the film 16 is delivered out from the cartridge 12. The film 16 which has been delivered out is nipped by the nip roller pair 68, inserted in the guide grooves 66, and reaches the window portion 62. Because the portion of the film 16 which has reached the window portion 62 is illuminated from behind by the lamps 88 of the light source 86, the images of the film 16, and even the dark portions or the like thereof, can be clearly confirmed.

When the film 16 guided by the guide grooves 66 reaches the interior of the film accommodating portion 64, the film 16 is guided by the plate springs 82 and, due to the tendency thereof to curl, curls into a cylindrical shape. Because the radii of curvature of the plate springs 82 are set to be small to a certain extent, the film 16 can be made to curl such that the diameter thereof is small at first. As more of the film 16 is delivered in, the diameter thereof gradually increases. However, because the urging force of the plate springs 82 acts in the direction toward the inner side of the film 16, the film 16 is wound in an orderly manner without any gaps. Further, as the diameter of the film 16 increases, the plate springs 82 are pushed outwardly and allow the expansion of the outer diameter of the film 16.

The film 16 is successively conveyed, and when the turn-around perforation 26 reaches the position between the LED 106 and the optical sensor 104, the amount of light received by the optical sensor 104 changes, and as a result, the control circuit 110 lights the film end indication lamp 108. It can therefore be known that the image frame 18 positioned at the window portion 62 is the final image frame 18A.

When the film 16 is to be rewound, the knob 46 may be rotated in the counterclockwise direction.

When the cartridge 12 is inserted into the cartridge accommodating portion 54, the film end indication lamp 108 is lit until the film 16 reaches the position between the LED 106 and the optical sensor 104. However, because the film 16 is not at the window portion 62, it can be known that the film end (the trailing end portion of the film 16) has not been reached even though the film end indication lamp 108 is lit.

In this way, by using the film viewer 10, the film 16 accommodated in the cartridge 12 can be viewed without being touched by hands. Therefore, no dirt from handling adheres to the film 16, and the film 16 is not damaged.

After the film 16 has been viewed, the cartridge 12 is removed from the cartridge accommodating portion 54. At this time, when the bottom cover 56 is opened, the driver 112 urged by the coil spring 122 pushes the cartridge 12 out a predetermined amount. Here, when the cartridge 12 moves apart from the deep portion of the cartridge accommodating portion 54, the driver 112 rotates in the direction opposite to the direction of rotation at the time the cartridge 12 is inserted, and the door of the cartridge 12 is closed automatically. Further, by pulling out the cartridge 12, the main switch 102 is turned off, the lamps 88 and the LED 106 are turned off, and the operation of the control circuit 110 stops.

In this way, in the film viewer 10 of the present embodiment, the door of the cartridge 12 can be opened automatically merely by inserting the cartridge 12 in the cartridge accommodating portion 54. Further, the door can be closed automatically merely by removing the cartridge 12. Therefore, operation is simple, and there is no forgetting to shut the door. Further, because the main switch 102 is turned on and off by the insertion and removal of the cartridge 12, forgetting to turn off the switch after the film 16 has been viewed can be prevented.

In the film viewer 10 of the present embodiment, when the film 16 enters into the film accommodating portion 64, the film 16 curls and is accommodated in a cylindrical shape. Therefore, in the film accommodating portion, there is no need to provide, for example, a take-up shaft and a mechanism for rotating the take-up shaft as in a camera, and the structure can be simplified.

When the final image frame 18A is reached, if the spool 14 is rotated any further, the film 16 will be wound the wrong way onto the spool 14. However, in the film viewer 10, the film end indication lamp 108 is lit when the turn-around perforation 26 indicating the final image frame 18A is detected. Therefore, incorrect winding of the film 16 can be prevented.

Figure 7:
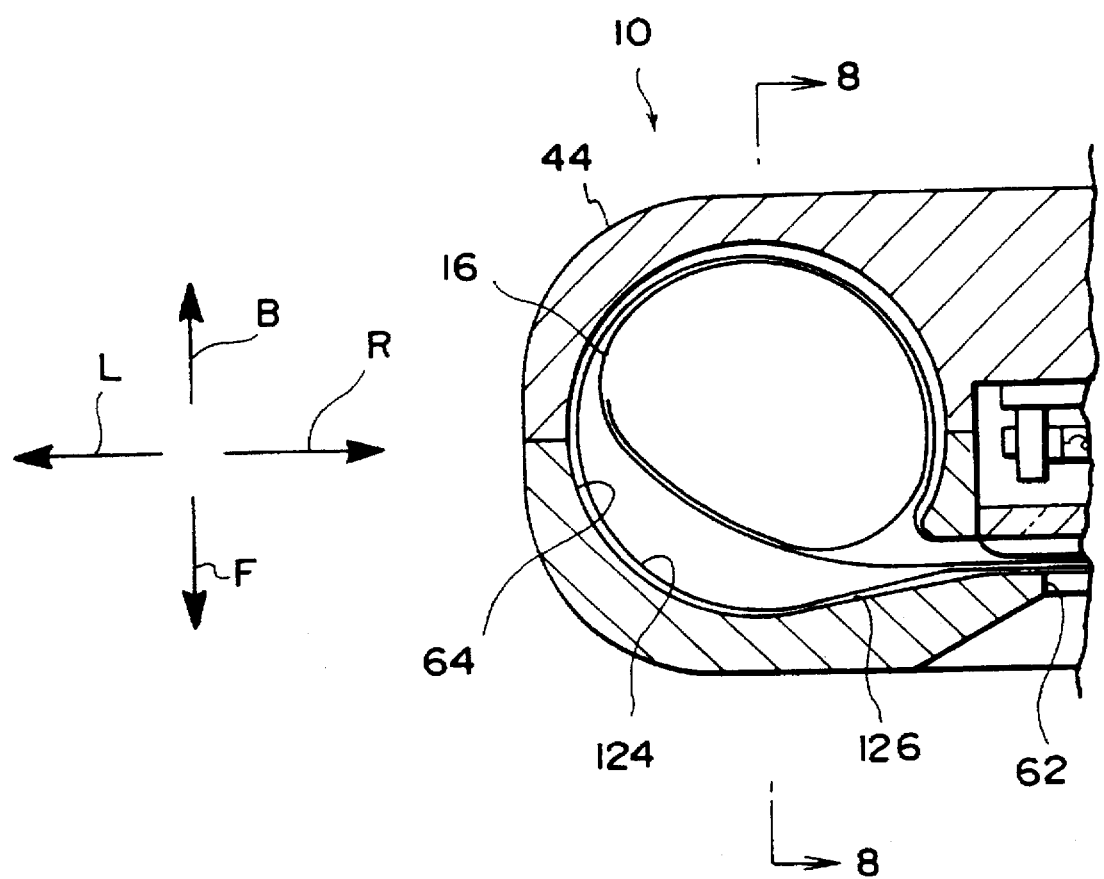
FIG. 7 is a cross-sectional view, viewed from above, of a film viewer relating to another embodiment.
Figure 8:
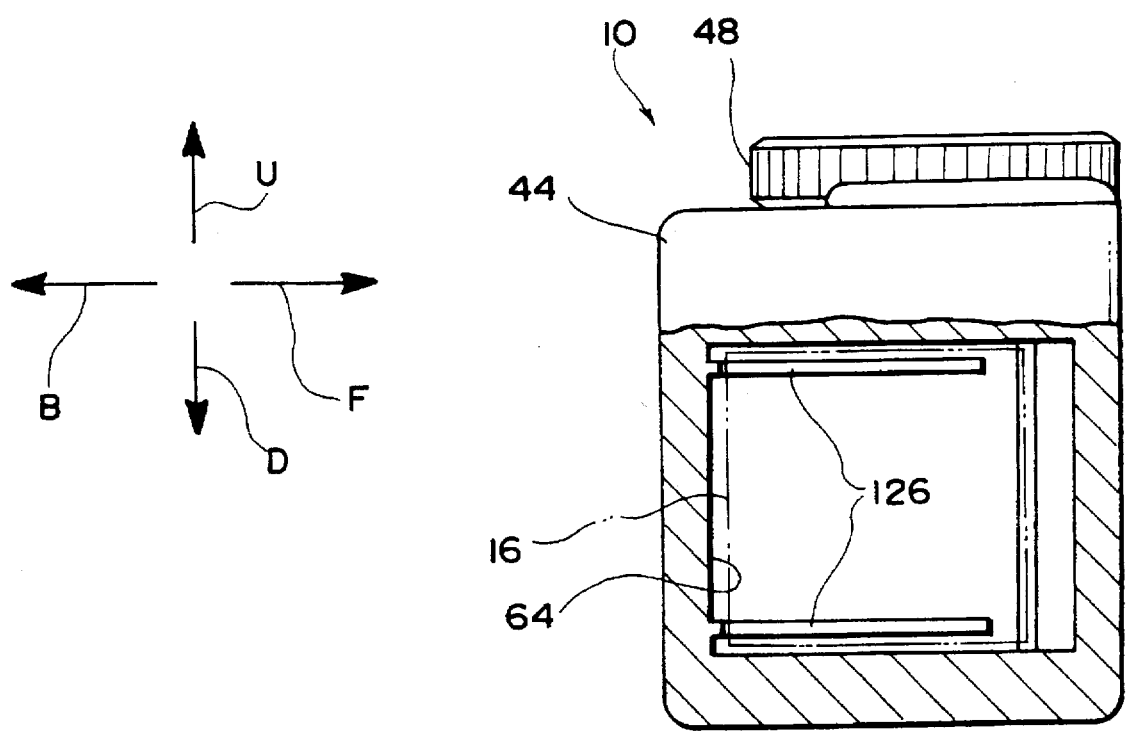
FIG. 8 is a partial cross-sectional view, viewed from a left side, of the film viewer relating to the embodiment illustrated in FIG. 7.
Figure 9:
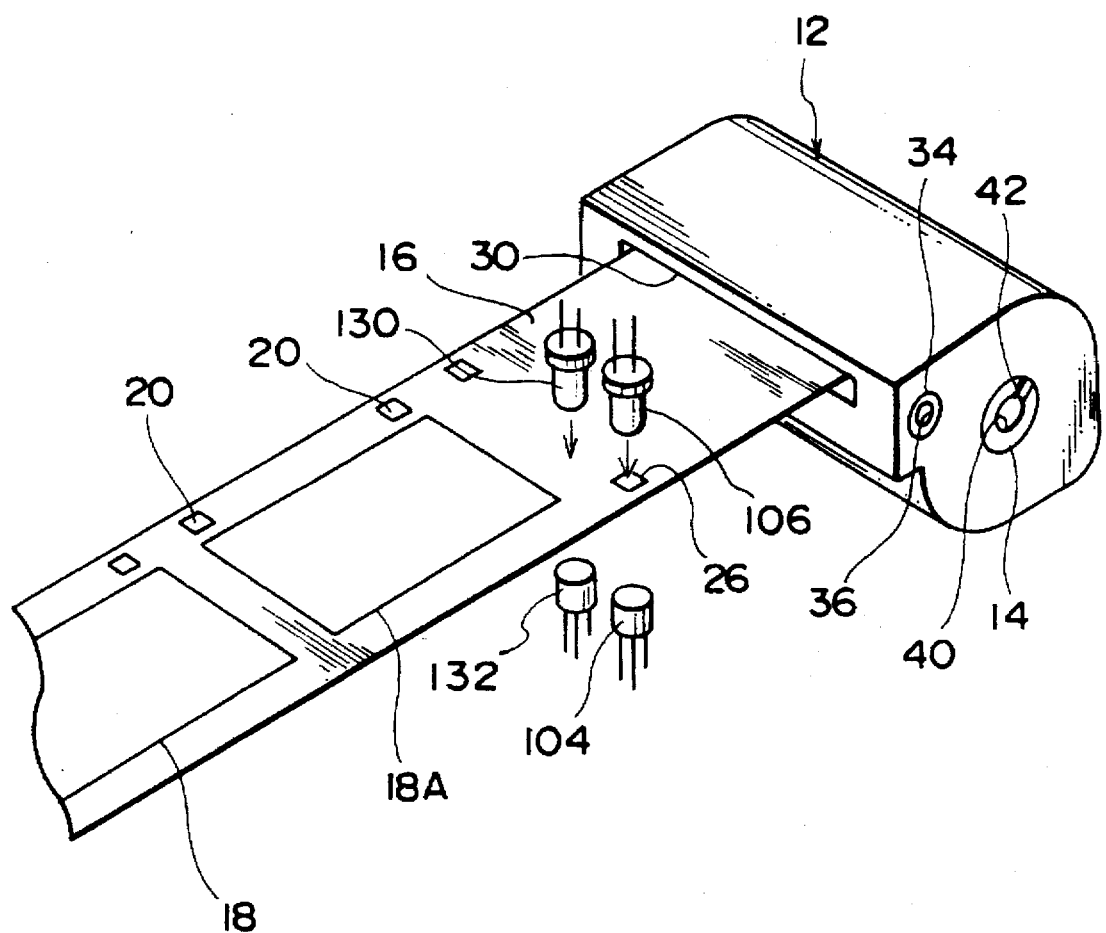
FIG. 9 is a perspective view illustrating an optical sensor and an LED of the film viewer relating to yet another embodiment.

In the present embodiment, the film 16 which has reached the interior of the film a accommodating portion 64 is guided by the plate springs 82. However, as illustrated in FIGS. 7 and 8, a pair of ribs 126 having curved surfaces 124 may be provided in the film accommodating portion 64, and the film 16 may be guided by the curved surfaces 124. In this case, it is preferable that plush or the like is adhered to the curved surfaces 124.

Further, in the present embodiment, the end of the film 16 is detected by the LED 106 and the optical sensor 104. However, in addition, an LED 130 and a optical sensor 132 may be provided at a position which does not correspond to any of the perforations (e.g., at a position corresponding to the substantially central portion of the film 16). If the control circuit 110 determines that the film end indication lamp 108 is to be turned on when only the voltage Va of the optical sensor 104 is greater than or equal to the reference voltage Vth, it is possible to turn the film end indication lamp 108 on only when the turn-around perforation 26 is detected.

Although the film end indicating means is provided in the present embodiment, it is also possible to stop the film mechanically (by using a pin or the like) as in the frame stopping mechanism of a conventional 110 camera.

Because the film viewer of the first aspect of the present invention has the above-described structure, a film accommodated in a cartridge can be viewed easily without being touched by hands. Further, the structure can be simplified because there is no take-up shaft in the film accommodating portion as there is in a camera for example. Accordingly, excellent effects are achieved in that the number of parts can be reduced, assembly can be simplified, and the film viewer 10 can be manufactured at a low cost. In the film viewer of the second aspect of the present invention, because portions of the film contact the curved springs, a superior effect is achieved in that the film can reliably be curled and accommodated in the film accommodating portion. Further, the diameter of the film which first curls in a cylindrical shape is made small, and the film is wound in an orderly manner without any gaps.

In the film viewer of the third aspect of the present invention, because portions of the film contact the curved surfaces of the ribs, an excellent effect is achieved in that the film can reliably be curled and accommodated in the film accommodating portion.

In the film viewer of the fourth aspect of the present invention, when the cartridge is accommodated in the cartridge accommodating portion, the door is opened automatically. Therefore, operation is easy.

In the film viewer of the fifth aspect of the present invention, when the cartridge accommodated in the cartridge accommodating portion is removed therefrom, the door is closed automatically. Therefore, operation is easy. Further, superior effects are achieved in that there is no forgetting to close the door of the cartridge, entry of dust and the like into the cartridge can be prevented, and the quality of the film within the cartridge can be maintained.

In the film viewer of the sixth aspect of the present invention, the film corresponding to the window portion can be illuminated. Therefore, the image frames, and even the dark portions thereof, can reliably be observed.

In the film viewer of the seventh aspect of the present invention, when the cartridge is accommodated into the cartridge accommodating portion, the light source is automatically lit, and when the cartridge is removed, the light source is turned off. Therefore, operation is easy, forgetting to turn off the light source can be prevented, and wasteful consumption of the batteries or the like used for the light source can be prevented.

In the film viewer of the eighth aspect of the present invention, when the film end is detected, the indicating member indicates that the film end has been reached. Therefore, an excellent effect is achieved in that winding of the film onto the spool in the wrong way due to further rotation of the rotating shaft can be prevented.

What is claimed is:

1. A film viewer comprising:
   a cartridge accommodating portion which accommodates a cartridge, the cartridge having a spool for taking up a film, a door provided at a film entrance/exit, and an engagement shaft for opening and closing the door, said film viewer being used to view a film which is wound on the spool and removed from the cartridge;
   a rotating shaft provided in said cartridge accommodating portion and engaging the spool when the cartridge is accommodated into said cartridge accommodating portion;
   a film accommodating portion which accommodates the film removed from the cartridge;
   a window portion provided between said cartridge accommodating portion and said film accommodating portion, the film being viewable through said window portion; and
   a door opening member engaging the engagement shaft of the cartridge to open the door of the cartridge at the time the cartridge is accommodated into said cartridge accommodating portion.

2. A film viewer according to claim 1, wherein said film accommodating portion has curved springs which contact portions of the film.

3. A film viewer according to claim 1, wherein said film accommodating portion has ribs having curved surfaces which contact portions of the film.

4. A film viewer according to claim 1, wherein said door opening member has a driver, and the door is opened by said driver being rotated.

5. A film viewer comprising:
   a cartridge accommodating portion which accommodates a cartridge, the cartridge having a spool for taking up a film, a door provided at a film entrance/exit, and an engagement shaft for opening and closing the door, said film viewer being used to view the film which is wound on the spool and removed from the cartridge;
   a rotating shaft provided in said cartridge accommodating portion and engaging the spool when the cartridge is accommodated into said cartridge accommodating portion;
   a film accommodating portion which accommodates the film removed from the cartridge;
   a window portion provided between said cartridge accommodating portion and said film accommodating portion, the film being viewable through said window portion; and
   a door closing member operating the engagement shaft of the cartridge to close the door at the time the cartridge accommodated in said cartridge accommodating portion is removed therefrom.

6. A film viewer according to claim 5, wherein said door closing member has a driver, and the door is closed by said driver being rotated.

7. A film viewer according to claim 1, further comprising:
   a light source illuminating the film corresponding to said window portion.

8. A film viewer according to claim 7, further comprising:
   a switch which turns on said light source by insertion of the cartridge into said cartridge accommodating portion.

9. A film viewer comprising:
   a cartridge accommodating portion which accommodates a cartridge, the cartridge having a spool for taking up a film, a door provided at a film entrance/exit, and an engagement shaft for opening and closing the door, said film viewer being used to view the film which is wound on the spool and removed from the cartridge;
   a rotating shaft provided in said cartridge accommodating portion and engaging the spool when the cartridge is accommodated into said cartridge accommodating portion;
   a film accommodating portion which accommodates the film removed from the cartridge;
   a window portion provided between said cartridge accommodating portion and said film accommodating portion, the film being viewable through said window portion; and
   a detecting member detecting a trailing end portion of the film.

10. A film viewer according to claim 9, further comprising:
    an indicating member indicating that the trailing end portion has been reached when the trailing end portion is detected by said detecting member.

11. A film viewer comprising:
    a cartridge accommodating portion which accommodates a cartridge, the cartridge having a spool for taking up a film, a door provided at a film entrance/exit, and an engagement shaft for opening and closing the door, said film viewer being used to view the film which is wound on the spool and removed from the cartridge;
    a rotating shaft provided at said cartridge accommodating portion and engaging the spool when the cartridge is accommodated into said cartridge accommodating portion;
    a knob provided at one axial direction end portion of said rotating shaft and rotating said rotating shaft;
    a film accommodating portion which accommodates the film removed from the cartridge, and has curved springs which contact portions of the film;

a window portion provided between said cartridge accommodating portion and said film accommodating portion, the film being viewable through said window portion;

a door opening member engaging the engagement shaft of the cartridge to open the door of the cartridge at the time the cartridge is accommodated into said cartridge accommodating portion, said door opening member having a driver, the door being opened by said driver being rotated; and a door closing member operating the engagement shaft of the cartridge to close the door at the time the cartridge accommodated in said cartridge accommodating portion is removed therefrom, said door closing member having a driver, the door being closed by said driver being rotated.

12. A film viewer according to claim 11, further comprising:

light source illuminating the film corresponding to said window portion.

13. A film viewer according to claim 12, further comprising:

a switch which turns on said light source when the cartridge is accommodated into said cartridge accommodating portion.

14. A film viewer according to claim 11, further comprising:

a detecting member detecting a perforation indicating a trailing end portion of the film.

15. A film viewer according to claim 14, further comprising:

an indicating member indicating that the trailing end portion has been reached when the trailing end portion is detected by said detecting member.

16. A film viewer comprising:

a cartridge accommodating portion which accommodates a cartridge, the cartridge having a spool for taking up a film, a door provided at a film entrance/exit, and an engagement shaft for opening and closing the door, said film viewer being used to view the film which is wound on the spool and removed from the cartridge;

a rotating shaft provided at said cartridge accommodating portion and engaging the spool when the cartridge is accommodated into said cartridge accommodating portion;

a knob provided at one axial direction end portion of said rotating shaft and rotating said rotating shaft;

a film accommodating portion which accommodates the film removed from the cartridge, and has ribs having curved surfaces which contact portions of the film;

a window portion provided between said cartridge accommodating portion and said film accommodating portion, the film being viewable through said window portion;

a door opening member engaging the engagement shaft of the cartridge to open the door of the cartridge at the time the cartridge is accommodated into said cartridge accommodating portion, said door opening member having a driver, the door being opened by said driver being rotated; and a door closing member operating the engagement shaft of the cartridge to close the door at the time the cartridge accommodated in said cartridge accommodating portion is removed therefrom, said door closing member having a driver, the door being closed by said driver being rotated.

17. A film viewer according to claim 16, further comprising:

a light source illuminating the film corresponding to said window portion.

18. A film viewer according to claim 17, further comprising:

a switch which turns on said light source when the cartridge is accommodated into said cartridge accommodating portion.

19. A film viewer according to claim 16, further comprising:

a detecting member detecting a perforation indicating a trailing end portion of the film.

* * * * *